United States Patent [19]

Staab et al.

[11] Patent Number: 4,928,097

[45] Date of Patent: May 22, 1990

[54] REAL TIME PROCESS CONTROL USING MULTIPLE COMMUNICATION NETWORKS

[75] Inventors: Carl J. Staab; Kirk D. Houser; Donald J. Jones; Robert T. Ihrman, all of Pittsburgh; Donald A. Poepsel, Cheswick; Warren A. Edblad, Pittsburgh, all of Pa.

[73] Assignee: Westinghouse Electric Corp., Pittsburgh, Pa.

[21] Appl. No.: 206,080

[22] Filed: Jun. 10, 1988

[51] Int. Cl.⁵ .............................................. H04Q 1/00
[52] U.S. Cl. ...................... 340/825.500; 340/825.07; 340/825.52; 370/85.11
[58] Field of Search ................ 340/825.03, 825.06, 340/825.07, 825.5, 825.22, 825.23, 825.52; 364/468, 472, 478, 131, 133; 370/85, 88, 92, 95, 85.9, 85.11

[56] References Cited

U.S. PATENT DOCUMENTS

| | | | |
|---|---|---|---|
| 3,641,325 | 2/1972 | Arimura et al. | 364/472 |
| 4,124,887 | 11/1978 | Johnson et al. | 340/825.22 |
| 4,151,590 | 4/1979 | Azegami | 364/131 |
| 4,177,450 | 12/1979 | Sarrand . | |
| 4,347,563 | 8/1982 | Paredes et al. | 364/133 |
| 4,485,497 | 12/1984 | Miura | 364/472 |
| 4,698,629 | 10/1987 | Mori et al. | 340/825.23 |
| 4,763,254 | 8/1988 | Mori et al. | 370/88 |
| 4,805,168 | 2/1989 | Kato | 340/825.5 |

FOREIGN PATENT DOCUMENTS 130802 1/1985 European Pat. Off. .
132069 1/1985 European Pat. Off. .

Primary Examiner—Palmer C. DeMeo
Assistant Examiner—Edwin C. Holloway, III
Attorney, Agent, or Firm—G. E. Hawranko

[57] ABSTRACT

A communications arrangement for a distributed process control system operable to control an industrial process where different types of data must be communicated between a number of control drops or stations in varying timing priorities includes a first communication channel on which at least two of the control drops are connected. A second communication channel, independent of the first communication channel, accommodates the communication of a type of data that is not as critical in terms of timing as that which is communicated over the first communication channel. All of the control drops are connected to the second communication channel. A control processor, located at each of the control drops, determines the distribution of the types of data between the two communication channels according to a predetermined timing priority.

6 Claims, 2 Drawing Sheets

REAL TIME PROCESS CONTROL USING MULTIPLE COMMUNICATION NETWORKS

BACKGROUND OF THE INVENTION

1. Field of the Invention

This invention relates to a method and arrangement of providing real time process control by means of multiple communication networks. More particularly, this invention relates to such a process control arrangement which achieves extremely rapid response times for the processes being controlled by utilizing multiple, independent communications networks dedicated to the requirements of the particular data with which they are associated.

2. Description of the Prior Art

In the field of process control systems, recent developments in industrial automation have evolved from those in which a single supervisory computer controlled the process to those using a distributed system of dedicated microprocessors each responsible for a small aspect of the operation of the total control system. As a result of this reliance on a more distributed approach to process control, there has arisen a commensurate need to develop and refine communication schemes between the plurality of processors to ensure that the process would be completed or executed in a timely manner. One example of such a distributed process control configuration is the Westinghouse WDPF ™ system which has been applied to a wide range of industrial process control operations and is discussed in European Patent Application Nos. EP 0 132 069 and 0 130 802 which are assigned to the same assignee as the present application. In an application of this type of system to an industrial process control configuration, response times of 0.1 to 1.0 seconds could be adequately provided. However, as with other industrial process control configurations, tightly coupled control systems requiring response times of 25 milliseconds or less could not be adequately provided for.

In a process control system where it is required to provide for such a relatively rapid response time, there generally exists a wide diversity in the types of data that are being processed and, in the usage of that data. This wide diversity consequently results in a broad spectrum of data transfer rates. Typically, a single communication network can address very high data rates for limited amounts of data or larger amounts of data for proportionally reduced data rates.

An example of a process control system that would require such a wide diversity in the timing constraints for the different types of data would be a rolling mill process control system for a steel rolling operation. In such a system, it can be appreciated that as a work piece, which in this example is a steel slab, is transported from one roll stand to another, the process of rolling that steel slab into the exact gauge of steel desired, requires precise coordination between the speed and positioning information of the respective roller assemblies at these roll stands. In addition to the rapid coordination of the speed and positioning information, the overall rolling mill operation deals as well, with information for which the timing is not as critical; an example of such information is the historical data which provides the records of how the process has operated from an overall system viewpoint.

Recognizing this need for the rapid handling of certain information, one example of a prior art process control system that could be applicable, utilizes a communications scheme whereby the initialization of the receiving and transmitting stations is accomplished by means of a connecting link rather than a master control unit, such example being found in U.S. Pat. No. 4,177,450 which issued to P. Sarrand on Dec. 4, 1979. In this patent, the described communication arrangement provides that activity on the connecting link is monitored by each station and, based on a predetermined timing scheme, an initiation signal can be transmitted when there has been a lack of activity on the link. Additionally, this patent discloses that the predetermined timing scheme allows the setting of different take over times for the different stations depending on the priority of the various stations. Though this approach does provide for the rapid handling of some data communications between various stations, the effort necessary to establish the timing scheme would appear to be cumbersome in addition to the fact that the flexibility one might desire for the purpose of modifying the overall station arrangement, is greatly reduced. In addition, this approach only provides for one type of communications handling scheme and does not provide for the recognition that handling different categories of data in different manners so that a more precise handling of data for certain operations can be done.

SUMMARY OF THE INVENTION

It is therefore an object of this invention to provide a process control arrangement having distinct, multiple communications networks, one of which accommodates high speed information necessary for control operations requiring rapid response times, and another of which provides data base management information as well as communications of a general nature.

With this object in view, the present invention provides a communication arrangement for a process control system having a plurality of stations which can both receive and transmit information and wherein at least two of these stations are connected over a first, high speed communication channel and, further, wherein the stations are also connected over a second, lower speed communication channel for accommodating data base management as well as other general nature communications. The communications arrangement of the present invention further comprises a processor means at each station for determining which of the communications channels certain data is to communicated over.

DESCRIPTION AND OPERATION

Figure 1:
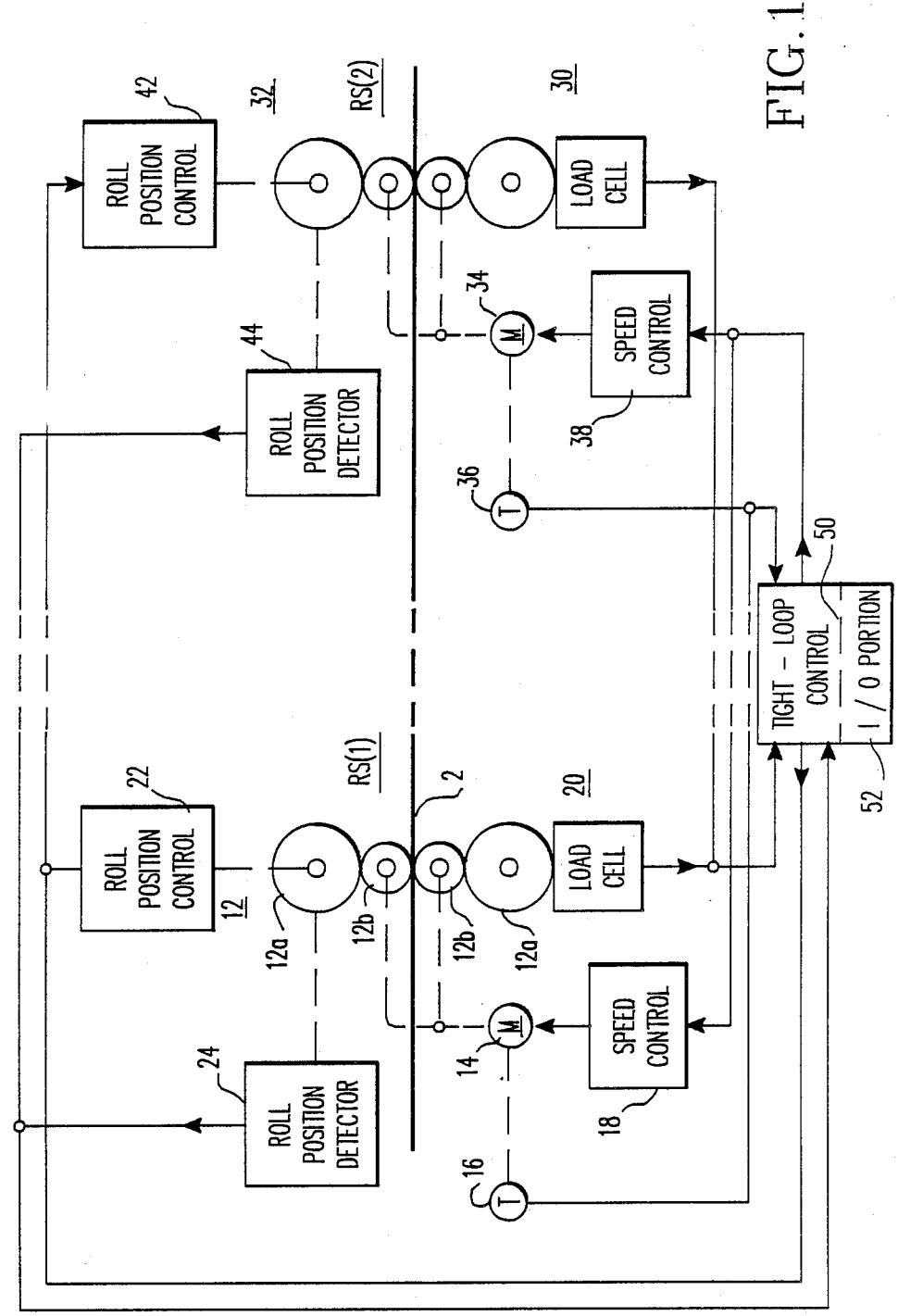
FIG. 1 is an schematic view, partly in block diagram form, of a process for which the present control system is applicable.

The rolling mill process configuration illustrated in FIG. 1 is but one example of an industrial process to which the present invention is applicable. A process control system to be used on such a configuration must perform supervisory control over the entire process as well as a specific, tight loop control over such parameters as the speed and positioning of a first set of rollers 12. An example of an existing gauge control system for a rolling mill operation can be found in U.S. Pat. No. 3,892,112 which issued on July 1, 1975 to A. W. Smith et al.

It is known that, in a rolling mill operation, precise coordination is required between the control parameters of adjacent roll stands. In order to prevent the stretching, pinching or buckling of the steel slab 2 as it is transported from a one roll stand 20 to a next roll stand 30, it is necessary to rapidly correct any deviation of the control parameter measured value from the preselected values for those control parameters. It can be appreciated that, in the rolling mill process, if the speed of the second set of rollers 32 is higher than desired, the effect will be the stretching of the steel slab 2 so as to result in a structural defect in that steel which, if the speed deviation continues or in fact worsens, results in a more pronounced defect in that run of steel. Similarly, if the speed of the second set of rollers 32 is slower than desired, the first set of rollers 12 will in effect, push the steel slab 2 causing the slab to buckle since the second set of rollers could not accept the slab 2 in as rapid a manner as desired.

In addition to the precise control of the speed control signals, it is also necessary to precisely coordinate the roller position signals so that the proper gauge of steel is achieved. In fact, any information which can be considered to be control data; that is, information which directly affects the control of the rolling mill operation, must be included under the control of a tight loop control arrangement 50 that allows for a response to a deviation in the expected value in as short a time period as possible, typically on the order of 30 milliseconds or, for certain applications, 5 milliseconds or less.

Therefore, as seen in FIG. 1, a conventional rolling mill system having a number of roll stands, designated in this illustration as a first roll stand 20 and a second roll stand 30, also includes transducer devices to measure the values of the data that must be tightly controlled and, control devices to effectuate the desired controls. A first motor 14 controls the speed of the first set of rollers 12, which as illustrated, include a pair of backup rollers 12a and a pair of work rollers 12b in the conventional manner. The first motor 14 can be a large DC motor which is controllably energized at the roll stand 20 over a speed control device 18 to achieve the desired speed of the rollers 12. A first speed transducer 16 is coupled to the motor 14 to provide a feedback signal to the tight loop control arrangement 50 that is a measurement of the speed of the first set of rollers 12. A first roll position control device 22 controls the opening of the first set of rollers 12 through which the work piece, the steel slab 2, is transported. A first roll position detector 24 provides the tight loop control arrangement 50 with a measurement signal representative of the position of the first set of rollers 12.

Similar to the arrangement for the first roll stand 20, the second roll stand 30 includes a second motor 34, a second speed control device 38 and second speed transducer 36 for respectively controlling and monitoring the speed of the second set of rollers 32. Additionally, the second roll stand 30 includes a second roll position control device 42 and second roll position detector 44 for respectively controlling and monitoring the position of the second set of rollers 32.

Figure 2:
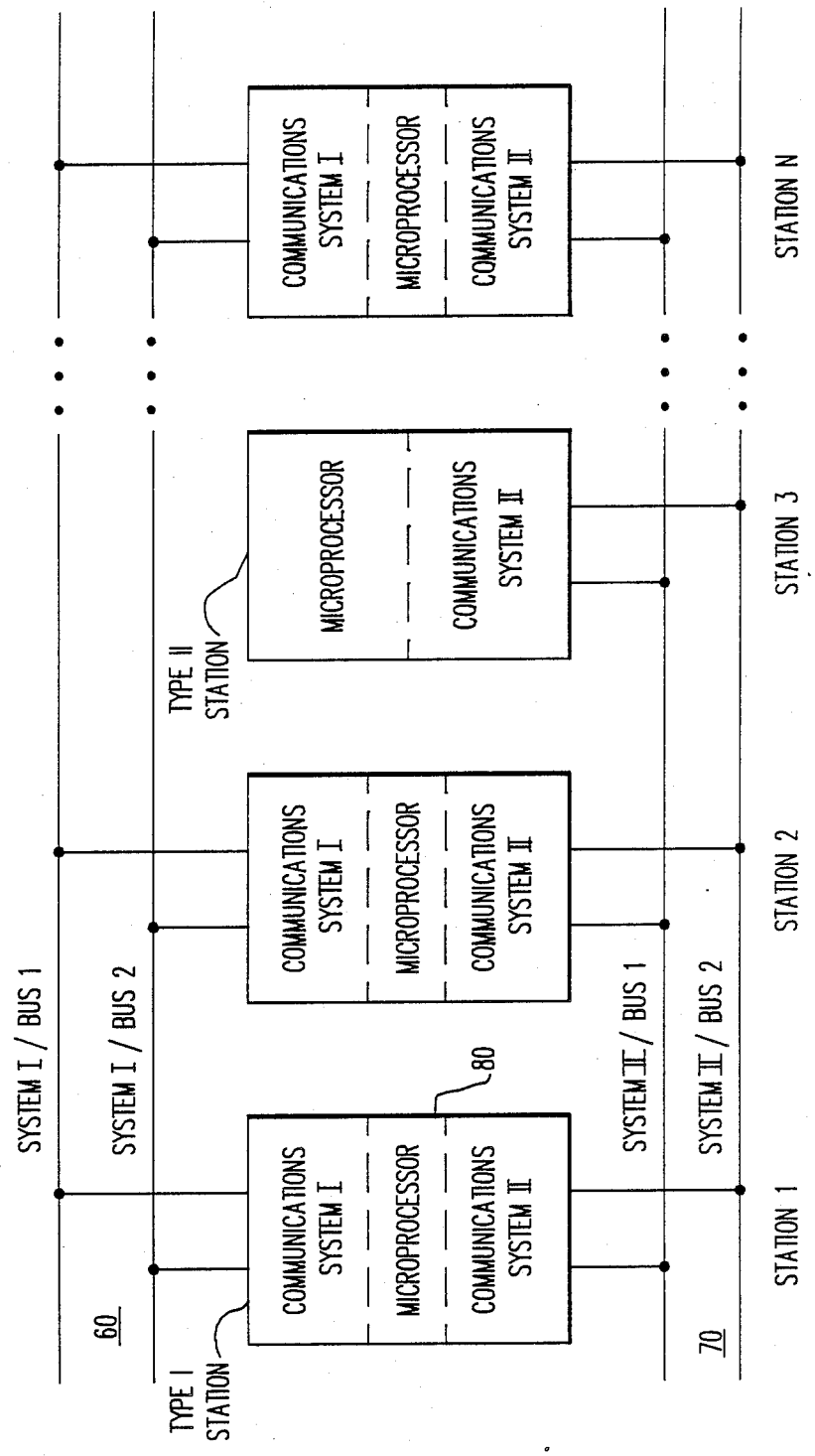
FIG. 2 is a functional block diagram of the process control system having multiple communications networks and which is constructed in accordance with the present invention.

The tight loop control arrangement 50 shown in FIG. 1 forms a portion of the overall system control arrangement shown in FIG. 2 as the communications system I. Though illustrated in FIG. 1 as a single block diagram element for the entire array of roll stands, it should be understood that this representation signifies that the first communication system I is a shared system among the roll stands. As will be discussed hereinafter in further detail, the first communication system I includes similar yet distinct components at each individual station.

In interfacing the first communication system I shown in FIG. 2 to the rolling mill operation shown in FIG. 1, there is included as a portion of the tight loop control arrangement 50, an input/output portion, hereinafter referred to as I/O portion 52. The I/O portion 52 can include a module or a group of modules, constructed in conventional manner, which provide signal translation between the signals communicated over the communication system I and the actual control devices which implement the control processes.

As seen in FIG. 2, there are essentially two types of stations or drops, that comprise the overall rolling mill system. The first type of station is that which has been previously described as controlling the operation of the roll stands, this being designated as Type I and including stations 1 and 2 as shown in FIG. 2. The second type of station, Type II, is the type where control data or information is not present, as for instance at an operator's console (not shown) where the functions performed typically include the gathering of historical data and the servicing of operator requests including the changing of a valve position for instance. It will be noted that Type I stations, are connected to both the first and the second communications systems I and II as shown in FIG. 2 while Type II stations are only connected to the second communication system II. It can be appreciated that Type I stations, in addition to providing the means by which the roll stands are controlled, must also be connected to the second communication system II in order to provide the information to the entire roll mill system as to the operating conditions of the roll stands.

Each of the Type I stations is coupled, over the first communication system I, to a first parallel bus configuration 60. A description relating to an example of a suitable first communication system I and its operation can be found in a separate patent application filed concurrently herewith and entitled "A Memory Imaging Network for Real Time Control"; such application being filed on June 10, 1988 having a Serial No. 205,269 ,and being assigned to the same assignee as the present invention. For purposes of this application, it is sufficient to know that the first communication system I provides communications of data on the order of 30 milliseconds or less. The manner in which this information is communicated in this time frame is one in which the first communications channel I supports a continuous memory refresh of data at each of the stations connected to the first communications channel I; that is, one common memory image is maintained at each of the stations through the use of broadcast messages from each station which originates information. In this manner, unlike the second communications channel II which provides for data filtering as will be described hereinafter in further detail, the first communications channel I does not provide this filtering nor does it provide for data base management information which could otherwise unnecessarily occupy this priority channel.

Recognizing that the first communications channel I is a priority channel, it is necessary that, since all information on this channel is shared by all stations or drops connected thereto, the number of stations on this channel be less relative to the number of stations on the second communications channel II. As an example, a process control arrangement for a steel rolling mill operation can be configured so as to accommodate as many as 254 stations or drops on the second communications channel II yet be capable of accommodating only as many as 64 stations or nodes on the first or priority channel I.

As further seen in FIG. 2, each of the stations, whether of the Type I or Type II station, are each connected, over a second serial bus configuration 70, to the second communication channel II. As previously stated, the second communications channel II employs a data filtering technique whereby all data that is transmitted thereover is not communicated to each station but only to those stations that have been preselectively set up to accept data having a specific global memory address.

A global memory addressing scheme as is employed for the second communications channel II has been described in the specification of the previously noted European Patent Application EP No. 0 132 069. In this specification, it is disclosed that an overall memory address scheme is established so that stations having the need for specific types of data can be set up to recognize common memory addresses; in other words, more that one station may be interested and have a need to know, specific data. In this case, a plurality of stations would be configured to have the same memory address assignment. In this same manner, all memory address designations would be assigned based on an overall global memory address which is a shared memory among all of the locations connected to the second communications channel II which would have that particular global address assignment.

As configured, the second communications channel II can support periodic data broadcast rates of 100 milliseconds and 1 second and is effective for handling data communications pertaining to data base management, general communications, and for the periodic data which is used for normal data acquisition system functions such as operator displays, event logging, etc. In addition, the second communication channel II provides the means by which the plant operators can fine tune the process by the manual control of the valves (not shown) and other process control elements (not shown).

At each station, Type I as well as Type II stations, the control element which determines whether data will be transmitted over one of the first and second communication channels, is the processor device 80 which is disposed at each location. It will be noted that at the type I stations, in addition to determining whether and what data to send over the communication channel, the processor 80 must determine whether the information is to be communicated over the first or the second communication channel. Though this task is illustrated as being performed by one processor, it can be appreciated that more than one processor can be utilized for this task as well as related operations.

In operation, the communication arrangement for a real time process control of a steel rolling mill operation having a number of roll stands through which a steel slab is transported and acted upon to achieve the proper gauge of steel, segregates information into two categories: control information and database management or general information. The control information which is communicated over the first communication channel controls operating characteristics which inherently require immediate response for purposes of correction of deviations from predetermined values. In this application, such control information includes the speed and positioning information for each of the respective roller assemblies for the plurality of roll stands that make up the steel rolling mill operation.

As the steel slab 2 is transported from one roll stand to another, as for example, from station 1 to station 2 as shown in FIG. 2, predetermined values for the speed and positions of the first roller assembly 12 and the second roller assembly 32 are known at the processors 80 of each of the first and second stations. Actual values of the speed and position of the rollers are then compared with the predetermined values to determine if there is a deviation in the process operation that must be corrected. The reading of and, if necessary, the correction of the actual control values is handled over the first communication channel to ensure that this operation is accomplished in a timely manner.

Although the hereinabove described embodiment constitutes a preferred embodiment of the invention, it can be appreciated that modifications can be made thereto without departing from the scope of the invention as set forth in the appended claims.

We claim:

1. A communications arrangement for a distributed process control system having a plurality of stations capable of sending and receiving data of at least two types, said communications arrangement comprising:
   a first communication channel over which at least two of said plurality of stations are connected;
   a second communication channel, independent of said first communication channel, over which said plurality of stations are connected;
   said first communication channel having a faster response time than said second communication channel;
   processing means disposed at each of said plurality of stations for determining which of said first and second communication channels such data is to be communicated over, said processing means making such determination as a function of the type of data to be communicated; and,
   wherein all data transmitted over said first communication channel is shared entirely by all stations connected to said first communication channel and data of a second type which is transmitted over said second communication channel, is distributed to stations disposed on said second communication channel on a preselected need to know basis and further wherein said second type of data to be transmitted over said second communication channel is control data which is utilized in a substantially immediate manner by said distributed process control system, said control data being distinguishable from data communicated over said first communication channel which is characterized as historical data.

2. A communications arrangement as set forth in claim 1 wherein data communicated over said second communication channel can be selectively distributed to only certain of said plurality of stations according to a predetermined addressing scheme.

3. A communications arrangement as set forth in claim 2 wherein said predetermined addressing scheme is a global memory addressing scheme in which specific values of such first and second types of data can be transmitted to more than one of said plurality of stations, said more than one of said plurality of stations having identical memory locations and contents for data which is to be shared by said distributed process control system.

4. A communications arrangement as set forth in claim 1 further comprising input/output means in signal communication with said processing means for interfacing such data as is necessary to perform process control functions to at least one process control device which operates in accordance with the status of such data.

5. A communications arrangement as set forth in claim 4 wherein said process control system is a steel mill rolling mill operation and such data as is necessary to be transmitted over said first communication network includes data which controls the speed of rollers associated with said rolling mill operation.

6. A communications arrangement as set forth in claim 1 wherein data is communicated over said first communication channel in a continuous, redundant manner.

* * * * *